(12) United States Patent
Barhudarian et al.

(10) Patent No.: US 11,405,425 B2
(45) Date of Patent: Aug. 2, 2022

(54) RICH TOKEN REJECTION SYSTEM

(71) Applicant: MICROSOFT TECHNOLOGY LICENSING, LLC, Redmond, WA (US)

(72) Inventors: Violet Anna Barhudarian, Kirkland, WA (US); Jiangfeng Lu, Bothell, WA (US); Caleb Geoffrey Baker, Seattle, WA (US); Oren Jordan Melzer, Redmond, WA (US); Anirban Basu, Sammamish, WA (US); Yordan Ivanov Rouskov, Seattle, WA (US); William Bruce Barr, III, Issaquah, WA (US); Radhika Kashyap, Redmond, WA (US); Carlos Adrian Lopez Castro, Duvall, WA (US); Pui-Yin Winfred Wong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 16/670,863

(22) Filed: Oct. 31, 2019

(65) Prior Publication Data

US 2021/0136113 A1    May 6, 2021

(51) Int. Cl.
*H04L 29/06* (2006.01)
*H04L 9/32* (2006.01)
*H04L 9/40* (2022.01)

(52) U.S. Cl.
CPC ......... *H04L 63/20* (2013.01); *H04L 9/3213* (2013.01); *H04L 9/3271* (2013.01); *H04L 63/0884* (2013.01); *H04L 63/105* (2013.01)

(58) Field of Classification Search
CPC ..... H04L 63/20; H04L 9/3213; H04L 9/3271; H04L 63/0884; H04L 63/105;
(Continued)

(56) References Cited

U.S. PATENT DOCUMENTS

| | | | | |
|---|---|---|---|---|
| 8,032,922 B2* | 10/2011 | Bhatia | ............... | G06F 21/6218 726/2 |
| 8,726,339 B2* | 5/2014 | Radhakrishnan | ... | H04L 63/0876 726/1 |

(Continued)

FOREIGN PATENT DOCUMENTS

| | | |
|---|---|---|
| WO | 2014015147 A1 | 1/2014 |
| WO | 2019079928 A1 | 5/2019 |

OTHER PUBLICATIONS

An Updateable Token-Based Schema for Authentication and Access Management in Clouds, Emadinia et al, Aug. 2019 (Year: 2019).*

(Continued)

*Primary Examiner* — Jahangir Kabir
(74) *Attorney, Agent, or Firm* — Workman Nydegger

(57) ABSTRACT

Authenticating computing entities. A method includes at an identity provider, providing a first access token to an entity for use by the entity in obtaining resources from a resource provider. The method further includes, at the identity provider, receiving response information from the entity. The response information from the entity is provided to the entity from the resource provider as a result of the resource provider enforcing policy at the resource provider. At the identity provider, a second access token is provided to the entity. The second access token is provided based on the response information, such that the second access token can be used by the entity to obtain the resources from the resource provider.

20 Claims, 7 Drawing Sheets

(58) Field of Classification Search
CPC ..... H04L 63/10; H04L 63/0807; G06F 21/44; G06F 2221/2115; G06F 2221/2129; G06F 21/6272; G06F 21/42
USPC .......................................................... 726/4
See application file for complete search history.

(56) References Cited

U.S. PATENT DOCUMENTS

| | | | |
|---|---|---|---|
| 8,850,546 B1* | 9/2014 | Field | H04L 63/102 726/8 |
| 10,243,945 B1 | 3/2019 | Kruse et al. | |
| 10,958,653 B1* | 3/2021 | Miller | H04L 63/10 |
| 2013/0047213 A1* | 2/2013 | Radhakrishnan | H04L 63/0807 726/4 |
| 2013/0086645 A1 | 4/2013 | Srinivasan et al. | |
| 2017/0230351 A1* | 8/2017 | Hallenborg | H04L 63/08 |

OTHER PUBLICATIONS

"International Search Report and Written Opinion Issued in PCT Application No. PCT/US2020/056230", dated Feb. 1, 2021, 13 Pages. (MS#407550-WO-PCT).

* cited by examiner

RICH TOKEN REJECTION SYSTEM

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

For example, an entity may be configured to access resources from a resource provider where the resource provider is a remote computing system. To obtain access to these resources, the entity will typically authenticate with an identity provider to receive an access token and a refresh token, where the access token can be presented to the resource provider in a request for resources. If the access token is valid, an authenticated user session is created between the resource provider and the entity to provide the resources.

However, typically an identity provider and resource provider do not have a communication channel to communicate with each other for each user session initiated. Rather, both the identity provider and the resource provider each have their own communication with the entity in facilitating the user session, but do not have the ability to communicate with each other, with respect to the user session, in creating the user session, or after the user session is created.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for authenticating computing entities. The method includes at an identity provider, providing a first access token to an entity for use by the entity in obtaining resources from a resource provider. The method further includes, at the identity provider, receiving response information from the entity. The response information from the entity is provided to the entity from the resource provider as a result of the resource provider enforcing policy at the resource provider. At the identity provider, a second access token is provided to the entity. The second access token is provided based on the response information, such that the second access token can be used by the entity to obtain the resources from the resource provider.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
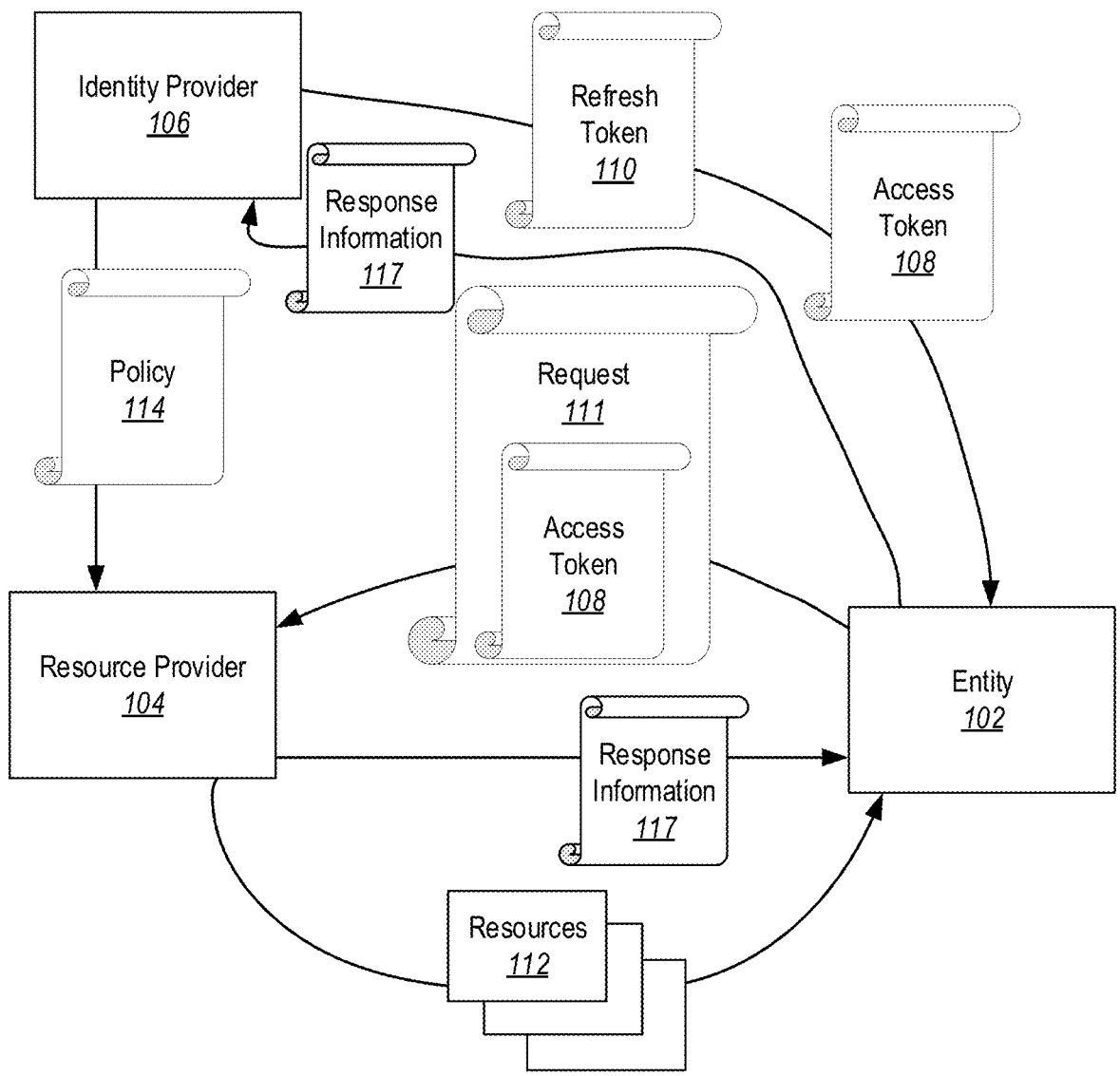
FIG. 1 illustrates a system for enforcing system wide policy.

Embodiments illustrated herein are directed to a smart client that can act as an intermediary to provide information from the resource provider to the identity provider. This allows for, and facilitates, communication between the identity provider and the resource provider for a particular user session. In particular, a technical problem exists whereby identity providers are generally unable to obtain information from resource providers and users about a user session after the user session has been established. Typically it is not feasible to configure resource providers to enforce policy as doing so affects the scalability of enterprise systems. In particular, it is expensive in terms of computational resources and administrator resources to reconfigure resource providers any time there is a policy change or any time there is a change that would necessitate revoking a user session. As the number of resource providers increases in such systems, cost in terms of computational resources and administrator resources increases proportionally. Thus, a system that requires each resource provider computer system to be reconfigured would necessarily need to be limited in the number of resource provider computer systems that could be implemented. Further, requiring each resource provider to be reconfigured would require a system that was able to track and manage all resource providers in a fashion that allowed them to be reconfigured. Further, requiring each resource provider to be reconfigured could actually take more time than simply allowing a token to expire, thus negating any benefit achieved by reconfiguring the resource provider computer systems. Thus, there is a need for systems which allow for highly scalable numbers of resource providers to be added to the enterprise system while still being able to address the need to invalidate unexpired tokens. This can be particularly important in cloud-based systems where resource providers can be quickly added, except when external constraints such as those illustrated above are placed on the systems.

Embodiments illustrated herein can solve this technical problem by implementing a technical means of transmitting computer messages using computer hardware, where the messages include information from resource providers to users during a user session, where the information is further passed to an identity provider, thereby facilitating communication from a resource provider to an identity provider during a user session. That is, in one practical application of the invention, communication is facilitated from resource providers to identity providers during an active user session between the resource provider and an entity attempting to obtain resources from the resource provider. It can be significant that an identity provider that authenticates entities and acts as a central policy authority is same entity that receives response information from resource providers. This allows the central policy authority to administer policy for entities for particular user sessions in a closed-loop fashion where the identity provider receives feedback from the resource providers with respect to policy enforcement. In contrast, previous systems were open-loop in that policy was enforced at the identity provider in a limited way; by determining whether or not to issue a token. Once the token was issued, the identity provider was not able to obtain any additional information about how the policy was being enforced.

This is solved, for example, in some embodiments, where the resource provider can provide information to an entity indicating why an access token from the entity has been rejected. This provides response information to the identity provider indicating how the policy is being enforced. In some embodiments, the entity can use this information to learn why a token has been rejected and respond accordingly. For example, if the information indicates that the entity needs a higher level of authentication, the entity can obtain a new access token from an identity provider using the higher level of authentication. In some embodiments, as part of this process, the entity can indicate to the identity provider that information has been received from the resource provider indicating that a higher level of authentication then used in a current user session is required.

Alternatively, in some embodiments, this information may simply be provided to the entity and the entity will not use the information, but rather will simply pass the information back to the identity provider which can respond accordingly. For example, the identity provider may issue a new access token to the entity which corrects the problems identified by the information provider. This new access token can be used by the entity to access resources at the resource provider.

Referring now to FIG. 1, an example is illustrated. FIG. 1 illustrates an entity 102. In the illustrated example, the entity 102 may include a user, a device and associated clients used by the user on the device. Note that the user is not necessarily a human user. The entity 102 may have need to access resources from a resource provider 104. The resource provider 104 is a computer system configured to administer computing resources to users. The resources may be stored at the resource provider 104, or may be obtained by the resource provider from other sources.

To obtain access to the resources, the entity will first authenticate with an identity provider 106. The identity provider 106 is a computing system configured to administer policy and to issue cryptographic tokens to entities to allow the entities to access resources from resource providers. The entity 102 can authenticate to the identity provider 106 through any one of a number of different well-known authentication and access token issuance schemes, other less well-known authentication schemes, or even future authentication schemes yet to be developed. Suffice it to say, in the particular example shown in FIG. 1, the entity 102 receives from the identity provider 106 an access token 108 and a refresh token 110, the access token being issued as a result of the identity provider 106 enforcing system wide token issuance policy.

The access token 108 typically includes a timestamp indicating when the access token was issued. The access token 108 may alternatively or additionally include information indicating when the access token 108 expires. In some embodiments, the access token 108 may include information about authentication procedures used by the entity 102 to authenticate to the identity provider 106. For example, the access token 108 may indicate that the access token 108 was obtained by the entity 102 authenticating to the identity provider using a simple user identity and secret authentication protocol. One such common protocol is the password authentication protocol, where the identity is a username and the secret is a password. Alternatively or additionally, if the entity 102 authenticated to the identity provider 106 using double factor authentication, this can be indicated in the access token 108. Alternatively or additionally, if the entity 102 authenticated to the identity provider using a certain strength of password, this sort of information can be indicated in the access token 108 itself. For example, the access token may indicate the minimum length of password used to authenticate to the identity provider, use of special characters in the password used to authenticate to the identity provider, use of both upper and lowercase letters in the password used to authenticate to the identity provider, absence of common passwords or other words in the password used to authenticate to the identity provider, etc.

In some embodiments, the access token 108 will be for a particular user as well as for a client used by the particular user. Thus, in this example, the entity 102 includes both the user and the client (e.g., application) used by the user. For example, the user may use a laptop computer with a corresponding laptop computer client to perform the authentication and resource requests. Thus, the access token 108 may include information about the laptop computer client of the entity 102. Alternatively, the user may use a smart phone to perform the authentication, in which case a corresponding smart phone client is used to perform the authentication and to perform resource requests, meaning that the access token 108 will be for an entity 102 including a user using a smart phone client.

Returning once again to the example illustrated in FIG. 1, the entity 102 can provide the access token 108 to the resource provider 104 in a request for resources from the resource provider 104. The resource provider 104 can evaluate the access token to determine that the entity 102 has been properly authenticated to the identity provider 106 and that the access token 108 is otherwise valid. In particular, the access token 108 may have an expiration and the resource provider 104 can determine that the access token 108 has not expired. Ordinarily, so long as this evaluation of the access token 108 passes the various checks, then the resources 112 will be provided to the entity 102. However, embodiments illustrated herein can implement functionality respect to the request 111 by the entity 102 to the resource provider 104.

In particular, FIG. 1 illustrates that the resource provider 104 can provide response information 117 to the entity 102. In particular, the information may be transmitted in various messages using various communication hardware at the resource provider 1042 communication hardware at the entity 102. Often, this response information 117 is provided as part of a request 111 for resources.

FIG. 1 further illustrates that the entity 102 can pass the response information 117 to the identity provider 106. In some embodiments, this can be accomplished by the entity participating in an authentication process where the entity authenticates with the identity provider. For example, the resource provider 104 can terminate the user session with the entity 102. As part of the termination (or in some embodiments rejection of the access token 108) the resource provider can provide the response information 117. In this particular example, the resource provider 104 terminates a user session with the entity 102 (or rejects an attempt by the entity 102 to establish a user session) and as part of the process provides the response information 117.

In some embodiments, the entity will then be redirected back to the identity provider 106 to obtain a different access token through an authentication process. As part of this process, the entity 102 can provide the response information 117 to the identity provider 106. The identity provider 106 can issue subsequent access tokens according to the response information 117 passed by the entity 102 to the information provider 106. For example, the resource provider 104 may provide response information 117 indicating that the entity 102 needs a higher level of authentication than was used to obtain the access token 108 to access certain resources at the resource provider 104. This response information 117 can be passed to the identity provider 106, which can then authenticate the entity 102 using a higher authentication level than previous used to issue a new access token that can be used by the entity 102 to access the resources 112 at the resource provider 104.

Figure 2:
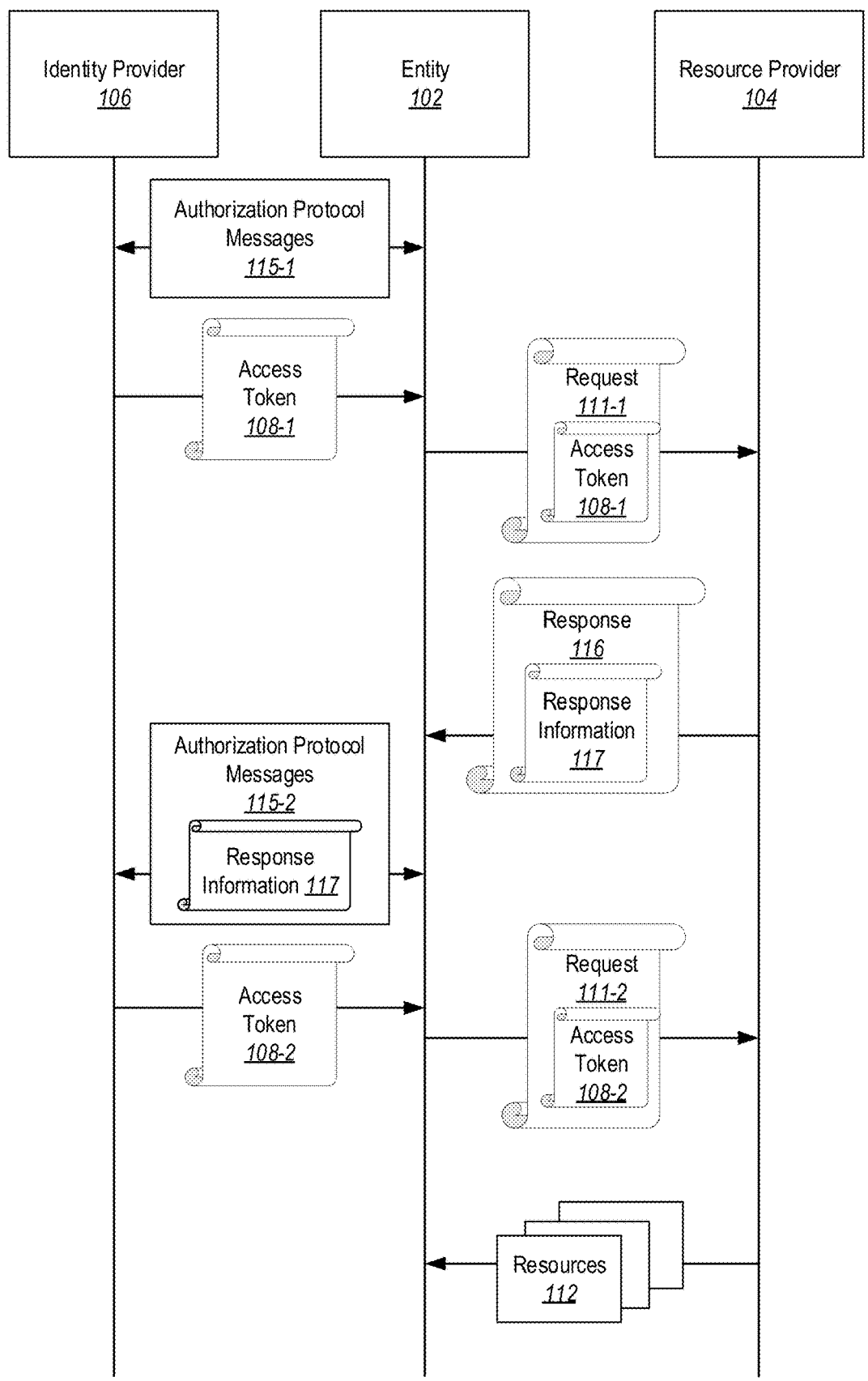
FIG. 2 illustrates a message flow diagram for enforcing system wide policy.

Referring now to FIG. 2, a more detailed example is illustrated. In the example illustrated in FIG. 2, the identity provider 106, entity 102, and resource provider 104 are illustrated. At a first time, the identity provider 106 and the entity 102 participate in an authentication protocol by exchanging authentication protocol messages 115. This results in the access token 108-1 being issued by the identity provider 106 to the entity 102.

At a subsequent time, the access token 108-1 is used in a request 108-1 to request resources 112. The resource provider 104 may determine that the resources 112 cannot be provided for some reason. For example, as illustrated previously, the access token 108-1 may not have been obtained using a sufficiently strong authentication method for the type of resources requested by the entity 102. The resource provider 104 can issue the response 116 which includes response information 117 indicating the reason why a user session cannot be created between the resource provider 104 and the entity 102. For example, as illustrated above, the response information 117 may indicate that the entity 102 is not using a token 108-1 having been obtained using a sufficient authentication method.

In some embodiments, the entity 102 is able to access and read the response information 117 in the response 116. That is, the entity 102 may be made aware of the reason that a user session is being rejected by the resource provider 104 in spite of the entity 102 presenting a valid access token 108-1 to the resource provider 104. This can allow the entity 102 to respond by whatever programmatic means are implemented at the entity 102 for such situations.

Note that although FIG. 2 illustrates that the response information 117 is provided in a response 116 to a request for resources 112, the response information 117 may be provided during an existing user session if certain conditions have been met or the resource provider otherwise determines that the response information 117 should be provided to the identity provider 106 through the entity 102.

Ultimately, the response information 117 is passed to the identity provider 106 thus communicating information from the resource provider 104 to the identity provider 106 for a particular user session, even if that user session is an invalid user session that was never fully established or was established and later invalidated.

As illustrated in FIG. 2, in some embodiments the response information 117 is passed by the entity 102 to the identity provider 104 as part of a new set of authentication protocol messages 115-2. The identity provider 106 will use the response information 117 to create a new access token 108-2. The new access token 108-2 is then provided to the entity 102 as a result of the authentication protocol messages 115-2 and the response information 117.

The entity 102 can send a request 111-2 along with the access token 108-2 to the resource provider 104. The resource provider 104 can evaluate the token 108-2 and determine that the token 108-2 is sufficient (e.g., was obtained using multifactor authentication) for obtaining the resources 112. Thus, as a result, the resource provider 104 can provide the resources 112 to the entity 102.

Thus, in some embodiments a resource provider 104 will need to explain to an identity provider 106 a reason that certain actions were taken. For example, a resource provider 104 may require some specific level of authentication in general, or for access to certain resources. For example, an entity 102 may request access to information that requires a higher level of authentication than for other information. Thus, embodiments herein may use the modalities illustrated to communicate such response information 117, or other information from the identity provider 106 to the resource provider 104.

In one example, the resource provider 104 may indicate to the entity 102 certain response information 117. For example, the resource provider 104 can indicate to the entity 102 that higher levels of authentication are required to access certain resources being requested by the entity 102. In this example, the entity 102 can use the response information 117 provided by the resource provider 104 to indicate to the identity provider 106 that certain things are required from the identity provider 106. For example, the entity 102 can indicate to the identity provider 106 that multifactor authentication is required for the entity 102 to be able to access certain resources at the resource provider 104. The identity provider 106 can then authenticate the entity 102 using a multifactor authentication protocol to provide the entity 102 with a token 108-2 that is issued as a result of the multifactor authentication protocol.

In some embodiments, the entity 102 will not consume information passed by the resource provider 104 to the entity 102. Indeed, in some embodiments, the response information is not consumable by the entity 102 in that the entity is unable to decipher or otherwise directly use the information. Rather the entity 102 will simply pass that information to the identity provider 106 and the identity provider 106 can proceed accordingly. Thus, for example, the entity 102 may not be made aware in some embodiments that higher levels of authentication are needed. Rather, the resource provider 104 will simply indicate to the entity 102 that it is unable to provide the resources requested by the entity 102. Additionally, the resource provider 104 will provide a message to the entity 102 that is intended to be passed to the identity provider 106 where that message includes the response information 117 that indicates that a higher level of authentication is needed. In some embodiments, the resource provider 104 may simply terminate the user session with the user and direct the user back to the identity provider 106 along with a message including the response information 117 conveyed by the entity 102 from the resource provider 104 to the identity provider 106 that higher levels of authentication or other requirements are needed from the identity provider 106. The identity provider 106 can then respond accordingly to authenticate the entity 102 according to the response information 117 provided by the resource provider 104 to allow the entity 102 to access resources at the resource provider 104 using a token issued by the identity provider 106.

However, it should be appreciated, that in some embodiments the entity 102 can consume response information 117 provided by the resource provider 104 to the entity 102. For example, in addition to passing the response information 117 back to the identity provider 106, the entity 102 may include programmatic functions for performing certain actions as a result of receiving the response information 117.

Typically, an identity provider 106, that manages enterprise wide policy and enforces that policy by authenticating entities and making decisions about whether or not to issue access tokens to entities, and a resource provider 104 do not have a communication channel to communicate with each other on a user session basis for each user session initiated for an entity. However, the embodiments illustrated herein allow this communication to occur for each user session. In particular, the resource provider 104 can provide response information 117 to the identity provider 106 for a user session, and the identity provider 106 can provide information to the resource provider 104 through information included in a token 108 issued to the entity 102. In this way, user session information, in the form of the response information 117, can be provided from the resource provider 104 to the identity provider 106, and vice-versa. Thus, embodiments can address issues related to the nonexistence of a direct link from a resource provider 104 to an identity provider 106 for a particular user session.

Figure 3:
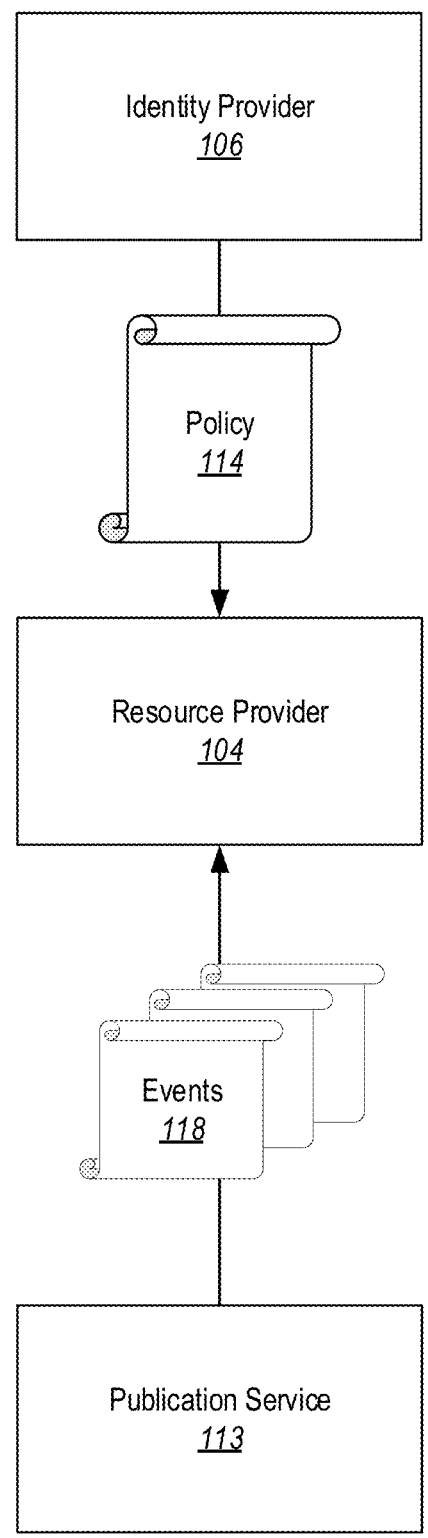
FIG. 3 illustrates a resource provider obtaining policy for enforcement at the resource provider.
Figure 4:
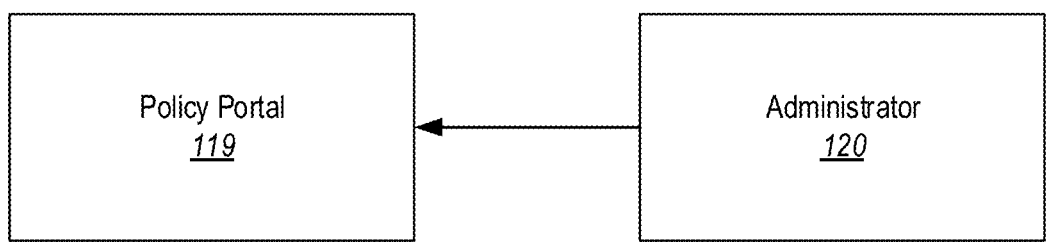
FIG. 4 illustrates an administrator setting policy at a policy portal.

Referring now to FIG. 3, the resource provider 104 can obtain policy from a number of different locations. In some embodiments, this policy may be used to in the process of generating the response information 117 illustrated in FIG. 2. For example, FIG. 3 illustrates that policy 114 is provided from the identity provider 106 to the resource provider 104. This policy 114 can then be used to evaluate requests from the entity 102 to determine if the requests for resources can be honored if the request for resources cannot be honored, then the resource provider 104 can provide the response 116 with the response information 117 indicating why the entity 102 is being denied access to the resources 112.

FIG. 3 illustrates an alternative source for policy information. In some embodiments, the resource provider 104 may subscribe to a publication service 113 the publication service 113 may be a centralized location where policy can be established. Thus, the resource provider 104 can subscribe to the publication service 113 to obtain events 118 that may contain or identify policy to be administered by the resource provider 104.

Typically, an event, policy, or combinations thereof will include one or more of the following: entity information, condition, timestamp, or action.

Entity information included in an event may include information identifying a particular user of an entity 102, device information for the entity 102, client information for the entity 102, user role information for the entity 102 (e.g., is the user acting as an administrator, or other special authoritative user), membership information for the entity 102, etc.

Condition information included in an event may include one or more conditions that should be evaluated to determine if a particular action should be taken.

A timestamp included in an event may indicate a time when the event was issued (or some other significant time). Alternatively or additionally, an event may include a timestamp identifying a time that should be conditionally evaluated.

An action included in an event indicates an action that should be taken with respect to the event. Notably, in some embodiments, actions are conditional meaning that certain actions should only be taken only when certain conditions are met.

Various examples are now illustrated.

As discussed above, in some embodiments events 118 may be issued from the publication service 113 to the resource provider 104 or policy may be issued from the identity provider 106 based on device state changes. In particular, the publication service 113 may be informed of changes to the device of the entity 102. This can be facilitated by the entity 102 being registered with a particular administrative service, periodic messages by the entity 102, general knowledge that devices of the type employed by the entity 102 have been changed generally, or in other ways. Thus, it should be noted that the publication service 113 may be connected by various interconnections to other systems that can provide information about the device state changes of the entity 102 such that appropriate events 118 can be issued.

The following illustrates a particular scenario illustrating one example of a device state change. In this example, an administrator 120 (see FIG. 3) has configured a policy (in a policy portal 119 at the identity provider 106, the publication service 113, or combinations thereof) to require a compliant (in that it complies with system policy) and healthy (in that it is functioning within some predefined functional standards) device as a condition for data access. The identity provider 106 extends ability to correlate an app session with the device ID to resource providers. The publication service 113, which in this case is a policy server, learns that a device for the user has fallen out of compliance, has a virus, or has otherwise failed to meet policy. The policy server publishes events 118 to the subscribers (e.g., the resource provider 104) for this user as a result. The event contains a conditional action that the subscribers need to perform to comply with the policy. The condition, in this example, is a Device ID for an out of compliant device. As a result, the resource provider may terminate a user session and provide the response information 117 for use by the entity using the device, the identity provider, or combinations thereof.

As discussed above, in some embodiments events 118 may be issued from the publication service 113 or policy may be issued from the identity provider 106 to the resource provider 104 based on a change to a client application. In particular, a change to a client application can be detected by a policy server, such as the publication service 114 or identity provider 106, and one or more events or policy can be sent to resource providers, such as resource provider 104, as a result. Such changes to the client application may include updates to the client application (e.g., new versions), configuration changes to the client application, revocation by an administrator, etc.

The following illustrates a detailed example of a client application change scenario. In this scenario, an administrator has removed a certain client application from the list of trusted apps for a tenant (where in this example, the tenant is the entity 102). A policy server (such as a policy server implemented as or with the publication service 113 or the identity provider 106) publishes one or more events 118 or policy 114 to the subscribers (e.g., the resource provider 104) for this entity 102. At least one of the events 118 or policy 118 contains the action that the subscribers need to perform to comply with policy and the client ID for the removed application. The resource provider 104 can then terminate a user session with the entity 102, and provide the response information 117 indicating that the user session was terminated due to client application changes.

As discussed above, in some embodiments events 118 may be issued from the publication service 113 or policy may be issued from the identity provider 106 to the resource provider 104 based on user state changes. For example, such changes may be based on changes to user attributes. For example, one or more events 118 or policy 114 may be emitted if a password is reset or changed. Alternatively or additionally, one or more events 118 or policy may be emitted if a user account is disabled or deleted. Alternatively or additionally, one or more events 118 or policy may be emitted if a compromised user is detected. Etc. Again, this can result in the resource provider 104 terminating a user session and providing the response information 117 as illustrated above indicating that the user session was terminated due to user state changes.

As discussed above, in some embodiments events 118 may be issued from the publication service 113 or policy may be issued from the identity provider 106 to the resource provider 104 based on session state changes. For example, an administrator may revoke a user session. Alternatively or additionally, a policy server may detect an increase in a session's risk level. Such increased risk may be detected, for example, as a result of detecting that a device is on a certain network, located in a certain location, unusual input is being input at a device, or simply that risk conditions have generally increased, or based on other detected occurrences. This can result in termination of a user session by the resource provider 104 and providing the response information 117 as illustrated above indicating that the user session was terminated due to session state changes.

As discussed above, in some embodiments events 118 may be issued from the publication service 113 or policy may be issued from the identity provider 106 to the resource provider 104 based on policy state changes. For example, an administrator may change memberships or roles for a user, resulting in one or more events 118 or policy 114 being issued. This may ultimately result in the resource provider 104 terminating a user session and issuing the response information 117 indicating that the user session was terminated due to policy state changes.

When events or policy are to be issued (as illustrated in the examples above, or for other reasons), a policy server (such as is illustrated by the publication service 113 or the identity provider 106) publishes one or more events 118 or policy 114 to the subscribers (e.g., resource provider 104) for this user. Note that while a single resource provider is illustrated in FIG. 1, it should be appreciated that multiple resource provider can receive relevant events or policy for a particular entity. Note that events or policy can be emitted by the publication service 113 or identity provider 106 in a selective fashion to multiple resource providers. That is, in some embodiments, resource providers will only receive events or policy relevant to them. Thus, some events or policy will be sent to all resource providers for an entity, while other events or policy will be sent only to relevant resource providers. In other embodiments, all events or policy are sent to all resource providers for an entity, and the burden for determining if an event or policy is relevant for a resource provider is pushed to the resource provider.

The events 118 or policy contains the action(s) that the resource providers need to perform to comply with a particular policy. For example, an action specified in an event may include revoking the session and redirecting the user back to the identity provider 106. Alternatively or additionally, an action specified in an event may include blocking access to certain resources (or types of resources) or providing limited access (e.g., read only) to certain resources (or types of resources). Alternatively or additionally, conditions may be included in the event, such that the action included in the event may include revoking the session and redirecting the user back to the identity provider 106 if a condition is met. Etc. The actions may further include identifying what information should be included in the response information 117.

In some embodiments, the events 118 or policy 114 contain timestamps. In some embodiments, a condition, either included in an event or policy itself or implemented on all events or policy due to programmatic event handing protocols, causes the action in the events or policy to be performed only if the access token was issued prior to a particular event or policy being evaluated. For example, in one embodiment, the resource provider 104 compares the timestamps in one or more the events 118 or policy 114 with when the access token 108 was issued and applies the actions in the events 118 or policy only if the access token was issued prior to the timestamps in the events.

On redirection the identity provider 106 can perform various actions depending on the policy setting, the response information 117, or combinations thereof, such as displaying a suitable message to the user, prompting the user for stronger authorization, issuing a new access token to the user with the 'limited access' claim that can be used by resource provider 104 to restrict access to sensitive data, or combinations thereof.

Some embodiments may have a location based policy that needs to be enforced. For example, an enterprise may have a need to implement a different level of protection when users attempt to access resources from inside of a trusted network as compared to an attempt to access resources from un-trusted network. For example, the trusted network is the normal corporate intranet used by the enterprise, and thus greater levels of security and lower levels of risk can be assumed. Thus, an enterprise may wish to allow access to certain resources when an entity attempts to access those resources from the corporate intranet. For the same resources, when an entity attempts to access the resources from outside of the corporate intranet, the entities may be blocked.

Alternatively, it may be desirable to obtain additional authentication to allow access the same resources outside of the corporate intranet. For example, some embodiments may require multi-factor authentication if an entity 102 attempts to access the resources 112 on a system that is outside of the corporate intranet. To accomplish this, the policy 114 is implemented at the resource provider 104. For example, the resource provider 104 can determine if the access token 108 was issued using multifactor authentication and if the entity 102 is attempting to access the resources 112 outside of the corporate intranet. If the entity 102 attempts to access the resources 112 from outside of the corporate intranet using an access token 108 issued using single factor authentication, then the resource provider 104 can invalidate the user session and cause the entity 102 to re-authenticate to the identity provider 106 to obtain an access token issued using multifactor authentication. This can be indicated in the response information 117.

Note that by having the identity provider 106 provide the policy 114 to the resource provider 104, it should be appreciated that the identity provider 106 can provide the policy 114 to any resource provider to which the policy 114 is relevant. This creates a scalable system that is able to quickly and efficiently distribute policy to resource providers as needed. This eliminates the need to manually configure the various resource providers as well as the applications running on those resource providers or on the entities attempting to access resources from the resource providers. This allows the system to scale efficiently.

In particular, administrators simply need to configure the policy in an identity provider portal.

Additionally, if administrators attempt to configure certain policies, such as multifactor authentication, at the resource provider, they are unable to do so because the resource provider does not support certain functionality and understanding related to multifactor authentication itself or other types of authentication. Resource providers are limited to providing access or blocking access.

By configuring the policy with the identity provider, greater granularity can be achieved in policy enforcement. For example, different authentication methods may be able to be configured. Additionally, the use of the identity provider for receiving administrator input for configuring policy allows the administrator to globally administer policy in one central location.

Thus, embodiments herein are able to address this situation by allowing the resource provider to download policy from the identity provider. Stated differently, the identity provider can share administrator configured policy with the resource provider. At this point, the resource provider has the policy and can directly enforce the policy on the user when the user attempts to access resources at the resource provider.

For example, in some embodiments as described above, a resource provider can determine whether a user is attempting to access resources from a trusted location or from an un-trusted location. If the user is attempting to access the resources from an un-trusted location, the resource provider can directly apply policy related to un-trusted location attempts to access resources. For example, if a user attempts to access resources from an un-trusted location using an access token that was obtained in a fashion that is not compliant for un-trusted location access (e.g., the token was obtained using single factor authentication), then the resource provider can terminate the user session, thus invalidating the token and direct the user back to the identity provider to obtain appropriate credentials (e.g., using multi-factor authentication to obtain a token), for accessing resources from an un-trusted location according to policy configured by an administrator.

in some embodiments, policy may be based on behavioral patterns of users. For example, such behavioral patterns may include typing speed, a usual pattern of typos, intervals between various user inputs, machine usage patterns, application usage patterns, etc. An administrator 120 can configure a policy at the identity provider 106 that indicates that when risk level is increasing due to unexpected user behavioral patterns, that additional authentication is required to access resources. This policy can be provided to the resource provider from the identity provider 106 as illustrated above such that the resource provider 104 can enforce this policy when anomalies are detected in user behavioral patterns. In particular, user behavioral patterns are not easily detected by the identity provider 106 because the identity provider 106 has very limited interaction with the entity 102. That is, the entity 102 performs a limited interaction with the identity provider 106 to obtain an access token 110, and then uses the access token 110 at the resource provider 104 for accessing the resources 112 where a more rich interaction sequence is performed. In this way, the resource provider 104 is more suited to enforce behavioral pattern policy.

However, using the modalities illustrated previously, the policy 114 can nonetheless be configured at the identity provider 106 and subsequently be provided to the resource provider 104 for enforcement directly at the resource provider 104. For example, consider an example where an entity 102 interacts heavily with the resource provider 104. For example, this may occur when an entity uses web-based applications. For example, if an entity is using a web-based email application, web-based word processor, web-based spreadsheet, or even a web-based office suite, user behavioral patterns are readily apparent to the resource provider 104 providing the web-based resources. In particular, the resource provider 104 can readily detect typing speed, typos, switches between applications, or other behavioral patterns. These patterns can be compared with previous patterns exhibited by the entity 102 to detect a significant deviation from previous patterns. When this significant deviation occurs, the resource provider 104 can consult policy 114 provided previously by the identity provider 106 to determine what action should be taken. For example, if the entity 102 has previously authenticated using only single factor authentication, as indicated in an access token 108 provided by the user, and the policy 114 indicates that when a threshold level of variation from user behavioral patterns from previous interactions has occurred, that the session should be terminated, that multi-factor authentication is required, or both. Note that previous interactions may be measured as aggregated and averaged patterns over all time, aggregated and averaged patterns over particular times, a sliding window of patterns, manually configured patterns, combinations thereof, etc. The resource provider 104 can terminate the session and direct the entity 102 back to the identity provider 106 to obtain multi-factor authentication to start a new session with the resource provider 104. Alternatively, the resource provider 104 may be able to determine that the entity 102 already authenticated using multifactor authentication and can continue the session as the current session, in spite of significant changes to behavioral patterns, complies with policy provided by the identity provider 106 to the resource provider 104.

In some embodiments, an access token 108 provided by the identity provider 106 to the entity 102 can include information indicating whether or not policy 114 was configured for the particular entity 102. In particular, not every entity will have a particular type of policy, such as a location policy or behavioral pattern policy or other policy associated with the entity. Thus, some embodiments may include functionality for issuing access tokens with extended information indicating whether or not the policy is configured for the particular entity bearing the token. Thus, for example, if an entity 102 has policy configured for the entity 102 at the identity provider 106, the access token 108 for that entity 102 will indicate that policy exists at the identity provider 106 for the entity 102. Thus, in some examples, when an access token 108 is provided to a resource provider 104 to attempt to obtain access to certain resources 112, the resource provider 104 can inspect the access token 108 and determine that policy exists at the identity provider 106 for the entity 102 presenting the access token 108. In this case, the resource provider 104 can request the policy 114 from the identity provider 106, and can then enforce the policy 114 at the resource provider 104 for the entity 102 providing the access token 108.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
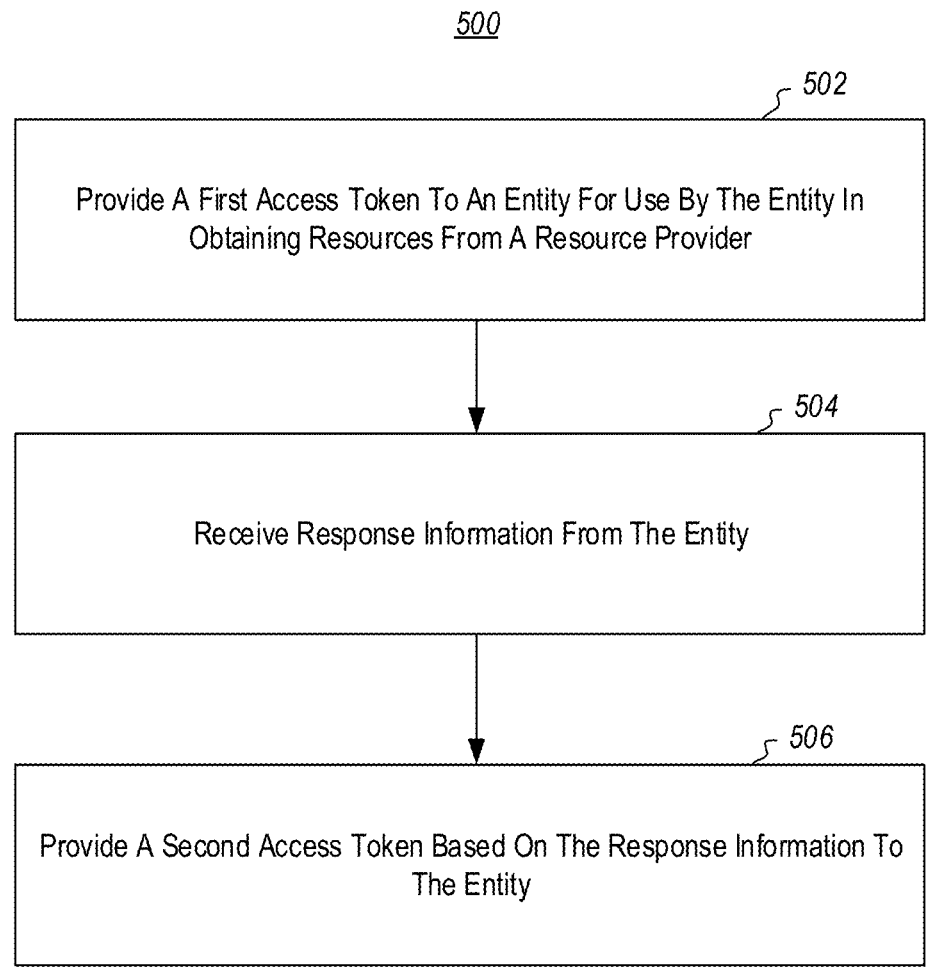
FIG. 5 illustrates a method of authenticating computing entities.

Referring now to FIG. 5, a method 500 is illustrated. The method 500 may be practiced in a computing environment, and includes acts for authenticating computing entities. The method 500 includes at an identity provider, providing a first access token to an entity for use by the entity in obtaining resources from a resource provider (act 502).

The method 500 further includes, at the identity provider, receiving response information from the entity (act 504). The response information from the entity has been provided to the entity from the resource provider as a result of the resource provider enforcing policy at the resource provider.

The method 500 further includes, at the identity provider, providing a second access token to the entity (act 506). The second access token is provided based on the response information. In this way, the second access token can be used by the entity to obtain the resources from the resource provider.

The method 500 may be practiced where the response information indicates that a higher level of authentication than was used to obtain the first access token is required for the entity to obtain the resources from the resource provider.

The method 500 may be practiced where the response information indicates the policy with respect to at least one of user state changes, client state changes, policy state changes, conditional access, location, or behavior patterns has been enforced.

The method 500 may be practiced where the response information indicates policy previously provided by the identity provider to the resource provider has been enforced.

The method 500 may be practiced where the response information indicates policy previously provided by a subscription service to the resource provider has been enforced.

The method 500 may be practiced where the response information includes information consumable by the entity in addition to information consumable by the identity provider.

The method 500 may be practiced where the response information is provided as a result of the policy indicating that the response information is required when enforcing the policy.

Figure 6:
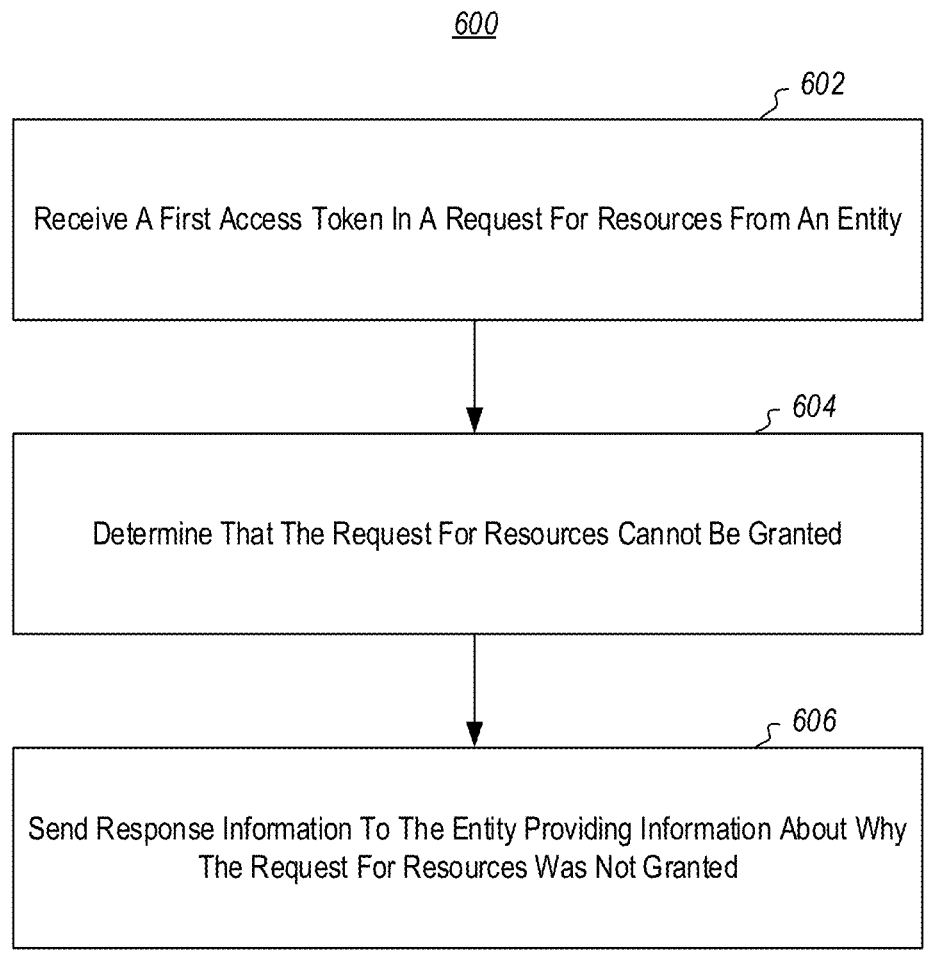
FIG. 6 illustrates a method of enforcing policy.

Referring now to FIG. 6, another method 600 is illustrated. The method 600 may be practiced in a computing environment, and includes acts for enforcing policy. The method 600 includes at resource provider, receiving a first access token in a request for resources from an entity (act 602). The token is for use by the entity in obtaining the resources from the resource provider. The token has been previously provided to the entity by an identity provider configured to authenticate the entity and enforce token issuance policy for a system by determining whether or not to issue access tokens to entities according to the token issuance policy.

The method 600 further includes, at the resource provider, determining that the request for resources cannot be granted (act 604). For example, this may be as a result of the resource provider enforcing policy (e.g., policy 114 or policy included in the events 118) at the resource provider.

The method 600 further includes, at the resource provider, sending response information to the entity (act 606). The response information provides information about why the request for resources was not granted, so that the response information can be later provided to the identity provider.

The method 600 may further include receiving a second access token from the entity. The second access token has been issued from the identity provider to the entity as a result of the response information.

The method 600 may be practiced were the response information indicates that a higher level of authentication than was used to obtain the first access token is required for the entity to obtain the resources from the resource provider.

The method 600 may be practiced were the response information indicates the policy with respect to at least one of user state changes, client state changes, policy state changes, conditional access, location, or behavior patterns has been enforced.

The method 600 may be practiced were the response information indicates policy previously provided by the identity provider to the resource provider has been enforced.

The method 600 may be practiced were the response information indicates policy previously provided by a subscription service to the resource provider has been enforced.

The method 600 may be practiced were the response information includes information consumable by the entity in addition to information consumable by the identity provider.

The method 600 may be practiced were the response information is provided as a result of the policy indicating that the response information is required when enforcing the policy.

Figure 7:
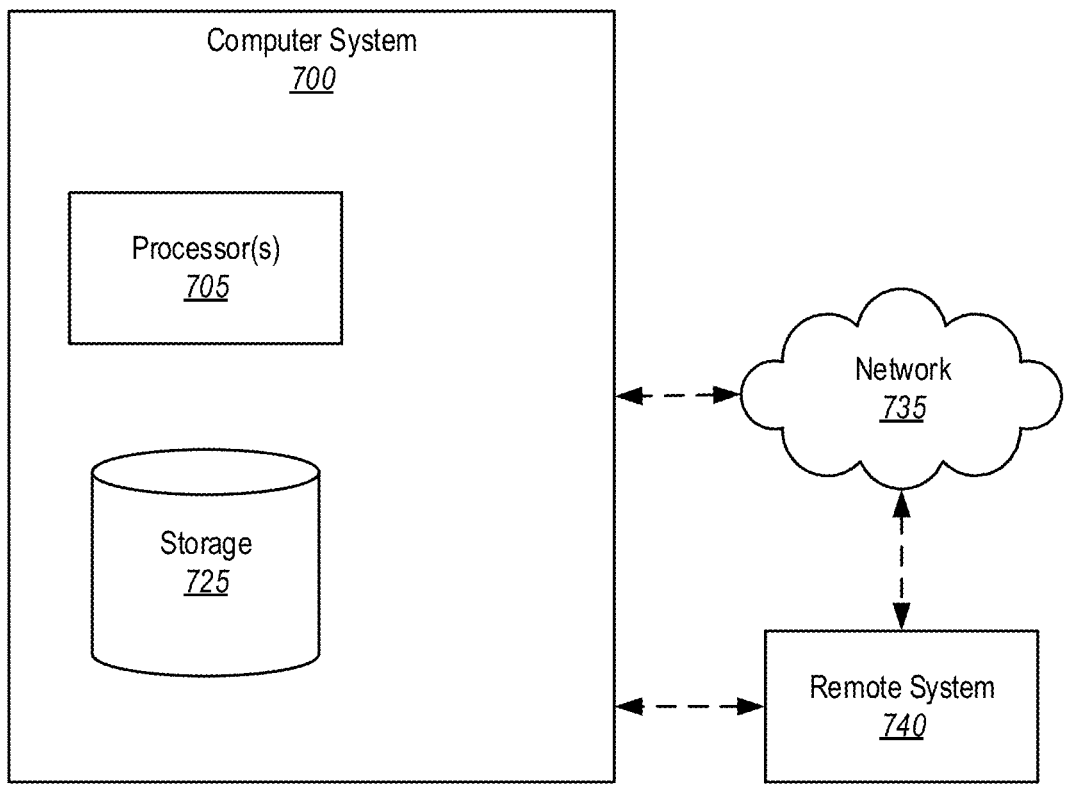
FIG. 7 illustrates a computer system where embodiments may be practiced.

Having just described the various features and functionalities of some of the disclosed embodiments, attention is now directed to FIG. 7, which illustrates an example computer system 700 that may be used to facilitate the operations described herein. Computer systems, such as system 700 may be used to implement any of the computer systems described above.

The methods may be practiced by a computer system 700 including one or more processors 705 and computer-readable storage 725 such as computer memory. In particular, the computer memory may store computer-executable instructions that when executed by one or more processors 705 cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media, such as the storage 725, for carrying or storing computer-executable instructions, data structures, or combinations thereof. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" (e.g., network 735) is defined as one or more data links that enable the transport of electronic data between computer systems, modules, other electronic devices, or combinations thereof. When information is transferred or provided over a network or another communications connection (either hardwired, wireless, or a combination of hardwired or wireless) to a computer (e.g., remote system 740), the computer properly views the connection as a transmission medium. Transmissions media can include a network, or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM, to less volatile computer-readable physical storage media at a computer system, or combinations thereof. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features, methodological acts, or combinations thereof, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of authenticating computing entities at an identity provider, the method comprising:
   providing a first access token to an entity for use by the entity in obtaining a particular resource from a resource provider in a user session;
   causing the entity to pass the first access token to the resource provider, wherein in response to rejecting the first access token, the resource provider is configured to send response information to the entity, indicating rejection of the first access token and a reason among a plurality of reasons for the rejection based on enforcing policy associated with a risk level of the user session, the plurality of reasons including at least a reason associated with requiring a higher level of authentication that was used to obtain the first access token based on the risk level of the user session;
   receiving the response information from the entity, the response information from the entity having been provided to the entity from the resource provider; and
   providing a second access token to the entity for accessing the particular resource, the second access token being provided to mitigate the rejection based on the reason for the rejection indicated in the response information, such that the second access token is used by the entity to obtain the particular resource from the resource provider.

2. The method of claim 1, wherein the response information indicates that a higher level of authentication than was used to obtain the first access token is required for the entity to obtain the particular resource from the resource provider.

3. The method of claim 1, wherein the response information indicates the policy with respect to at least one of user state changes, client state changes, policy state changes, conditional access, location, or behavior patterns has been enforced.

4. The method of claim 1, wherein the response information indicates policy previously provided by the identity provider to the resource provider has been enforced.

5. The method of claim 1, wherein the response information indicates policy previously provided by a subscription service to the resource provider has been enforced.

6. The method of claim 1, wherein the response information includes information consumable by the entity in addition to information consumable by the identity provider.

7. The method of claim 1, wherein the response information is provided as a result of the policy indicating that the response information is required when enforcing the policy.

8. In a computing environment, a method of enforcing policy at a resource provider, the method comprising:
receiving a first access token in a request for a particular resource from an entity for use by the entity in obtaining the particular resource from the resource provider in a user session, the first access token having been previously provided to the entity by an identity provider configured to authenticate the entity and issue a token based on the authentication;
determining that the request for the particular resource cannot be granted based on the first access token, as a result of the resource provider enforcing policy associated with a risk level of the user session at the resource provider;
rejecting the request for the particular resource from the entity;
sending response information to the entity, the response information providing a reason among a plurality of reasons about why the request for the particular resource was not granted, causing the entity to pass the response information to the identity provider, wherein the plurality of reasons includes at least a reason associated with requiring a higher level of authentication that was used to obtain the first access token based on the risk level of the user session, and when the identity provider receives the response information, the identity provider is configured to authenticate the entity again and generate a second access token for accessing the particular resource to mitigate the rejection based on the reason about why the request for the particular resource was not granted; and
in response to receiving the second access token from the entity, granting the entity access to the particular resource, the second access token having been previously provided to the entity by the identity provider.

9. The method of claim 8, further comprising, receiving a second access token from the entity, the second access token having been issued from the identity provider to the entity as a result of the response information.

10. The method of claim 8, wherein the response information indicates that a higher level of authentication than was used to obtain the first access token is required for the entity to obtain the resources from the resource provider.

11. The method of claim 8, wherein the response information indicates the policy with respect to at least one of user state changes, client state changes, policy state changes, conditional access, location, or behavior patterns has been enforced.

12. The method of claim 8, wherein the response information indicates policy previously provided by the identity provider to the resource provider has been enforced.

13. The method of claim 8, wherein the response information indicates policy previously provided by a subscription service to the resource provider has been enforced.

14. The method of claim 8, wherein the response information includes information consumable by the entity in addition to information consumable by the identity provider.

15. The method of claim 8, wherein the response information is provided as a result of the policy indicating that the response information is required when enforcing the policy.

16. In a computing environment, a system for enforcing policy, the system comprising:
an identity provider computing system, including at least one processor and at least one hardware storage device stored thereon first computer-executable instructions, when executed, the first computer-executable instructions configure the identity provider to:
provide a first access token to an entity in a user session in obtaining a particular resource from resource providers based on authentication of the entity; and
a resource provider computing system including at least one processor and at least one hardware storage device stored thereon second computer-executable instructions, when executed, the second computer-executable instructions configure the resource provider to:
receive the first access token from the entity in request for the particular resource from the entity;
determine whether or not the request for the particular resource can be granted based on the first access tokens, as a result of the resource provider enforcing the policy at the resource provider, the policy being associated with a risk level of the user session; and
in response to determining that the request from the entity among the requests corresponding to the first access token cannot be granted,
reject the request from the entity; and
send response information to the entity, the response information providing a reason among a plurality of reasons why the request for the particular resource was not granted, so that the response information can be later provided to the identity provider, the plurality of reasons including at least a reason associated with requiring a higher level of authentication that was used to obtain the first access token based on the risk level of the user session;
wherein the identity provider computing system is further configured to:
receive response information from the entity;
authenticate the entity again and generate a second access token for accessing the particular resource to mitigate the rejection based on the reason about why the request for the particular resource was not granted; and
provide the second access token to the entity, causing the entity to pass the second access token to the resource provider;
wherein the resource provider is further configured to:
receive the second access token from the entity;
determine that the request for the particular resource from the entity can be granted; and
grant the entity access to the particular resource.

17. The system of claim 16, wherein the response information indicates that a higher level of authentication than was used to obtain the particular first access token is required for the entity to obtain the particular resource from the resource provider.

18. The system of claim 16, wherein the response information indicates the policy with respect to at least one of user state changes, client state changes, policy state changes, conditional access, location, or behavior patterns has been enforced.

19. The system of claim 16, wherein the response information indicates policy previously provided by the identity provider to the resource provider has been enforced.

20. The system of claim 16, wherein the response information indicates policy previously provided by a subscription service to the resource provider has been enforced.

* * * * *